US008205064B2

(12) United States Patent
Vivenzio et al.

(10) Patent No.: US 8,205,064 B2
(45) Date of Patent: Jun. 19, 2012

(54) LATENCY HIDING FOR A MEMORY MANAGEMENT UNIT PAGE TABLE LOOKUP

(75) Inventors: Anthony F. Vivenzio, Taunton, MA (US); Denis J. Foley, Shrewsbury, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 132 days.

(21) Appl. No.: 11/768,375

(22) Filed: Jun. 26, 2007

(65) Prior Publication Data

US 2008/0282006 A1 Nov. 13, 2008

Related U.S. Application Data

(60) Provisional application No. 60/928,899, filed on May 11, 2007.

(51) Int. Cl.
 G06F 12/00 (2006.01)
 G06F 13/00 (2006.01)
 G06F 13/28 (2006.01)
 G06F 9/26 (2006.01)
 G06F 9/34 (2006.01)
(52) U.S. Cl. ........ 711/202; 711/154; 711/205; 710/107; 710/112
(58) Field of Classification Search .................. 711/154, 711/202, 205; 710/107, 112
See application file for complete search history.

(56) References Cited

U.S. PATENT DOCUMENTS

| 5,023,776 | A | * | 6/1991 | Gregor ........................... 711/122 |
| 5,564,111 | A | * | 10/1996 | Glew et al. ....................... 714/53 |
| 5,586,283 | A | * | 12/1996 | Lopez-Aguado et al. .... 711/207 |
| 5,613,083 | A | * | 3/1997 | Glew et al. ..................... 711/207 |
| 5,666,509 | A | * | 9/1997 | McCarthy et al. ............. 711/206 |
| 5,809,563 | A | * | 9/1998 | Yamada et al. ................ 711/207 |
| 6,260,131 | B1 | * | 7/2001 | Kikuta et al. .................. 711/210 |
| 6,665,788 | B1 | * | 12/2003 | Hughes ........................... 711/206 |
| 2004/0010675 | A1 | * | 1/2004 | Moritz ............................ 711/202 |

* cited by examiner

Primary Examiner — Michael Alsip
(74) Attorney, Agent, or Firm — Guerin & Rodriguez, LLP

(57) ABSTRACT

In certain systems, local requests require corresponding associated information to be present in order to be serviced. A local memory stores some of the associated information. There is latency associated with retrieval of associated information that is not immediately available. Logic operates for each local request to access the local memory to ascertain whether the associated information corresponding to the local request is present. If the associated information is present, a request is placed in an output request queue to service the local request. If the associated information is not present, a request is placed on a bypass path to retrieve the associated information. Requests issue from the bypass path with priority over requests from the output request queue. Useful work is thereby done during the latency of associated information retrieval. The arrangement is useful in a TLB in an MMU.

20 Claims, 12 Drawing Sheets

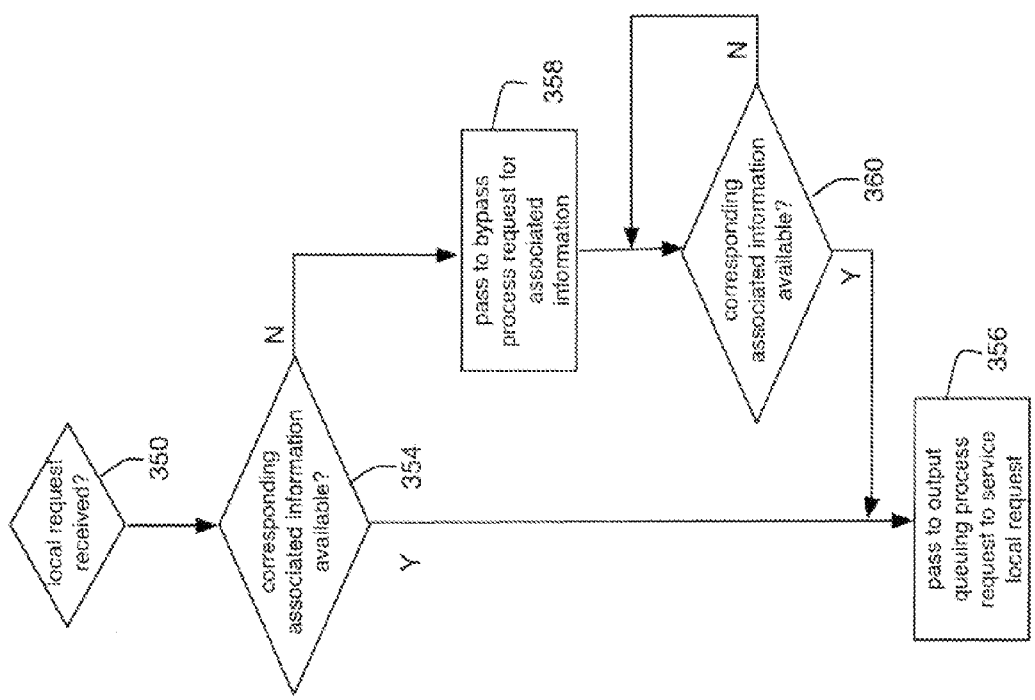

US 8,205,064 B2

LATENCY HIDING FOR A MEMORY MANAGEMENT UNIT PAGE TABLE LOOKUP

RELATED APPLICATION

This application claims the benefit under 35 U.S.C. 119(e) of U.S. Provisional Patent Application Ser. No. 60/928,899 filed on May 11, 2007, which is hereby incorporated by reference in its entirety.

FIELD OF THE INVENTION

The invention relates generally to the servicing of multi-stage memory access requests, and particularly to the handling of page table misses in a memory management unit.

BACKGROUND OF THE INVENTION

Many systems, including computers, network devices, storage devices, and handheld devices such as PDAs and cell phones, employ multiple subsystems, devices, and memories. These subsystems, devices, and memories are interconnected by one or more system busses over which they communicate. In some cases, a dependent multi-stage system has request may be required to service a transaction for a particular device in the system. For example, in devices employing memory management units (MMU), virtual addressing is used by the device so that it can operate from its own apparent contiguous address space. A virtual to physical address translation is performed by the MMU for each request to be sent onto the system bus so that the request is issued to the actual physical address of a memory or other device in the system. A translation look-aside buffer (TLB) is often implemented in an MMU as a cache of virtual to physical memory translations. When a request is issued with a virtual address, if the physical address associated with the virtual address is present in the TLB, then the request can be immediately issued, by the MMU to the physical address for which it is destined. A single system bus request issues in order to service the device request, thus this is a single stage request. If however the physical address associated with the virtual address is not present in the TLB, then a separate request must be issued to the system bus to retrieve the physical address from one or more page tables, usually stored in main memory. When the physical address has been retrieved, then the request itself can be issued to the system bus by the MMU. This is thus a multi-stage request requiring two system bus requests—one to retrieve a physical address, and the next to service the actual device request. The request is a dependent multi-stage request because the second stage request cannot issue until the first stage request, is completed. Therefore, this device request and all subsequent requests from the device are delayed by the latency of the first stage of the multi-stage request.

The latency associated with dependent multi-stage requests can contribute to significant performance degradation. It is desirable to service multi-stage requests in such a way as to reduce performance degradation due to the latency associated with, completing the multiple stages.

SUMMARY OF THE INVENTION

The invention operates in a system that issues local requests that can result in a multi-stage request on a bus to which, the system is coupled. Local requests require corresponding associated information to be present in order to be serviced, in accordance with the invention, a local memory stores some of the associated information. Logic is operable for each local request to access the local memory to ascertain whether the associated information corresponding to the local request is present, if the associated information is present, a bus request is placed in an output request queue to service the local request. If the associated information is not present, a bus request, is placed on a bypass path to retrieve the associated information. Bus requests are issued to the bus from the bypass path with priority over bus requests in the output request queue.

In other words, if the associated information for a local request is not present locally, a multi-stage request results. The first stage of the request is serviced by issuing a bus request for the associated information via the bypass path. The second stage of the request is serviced by queuing a bus request to service the request itself in the output request queue. The output request queue may already contain bus requests for servicing prior local requests. The first stage request on the bypass path will issue to the bus before the bus requests in the output, request queue. The bus requests in the output request queue are then serviced while the associated information is retrieved. System performance is enhanced because bus requests can issue during the latency period of a later multi-stage request.

The invention finds particular utility in a system having a memory management unit. In such a system, local requests include virtual memory addresses that must be translated to physical addresses. The memory management unit includes a translation lookaside buffer. If a virtual to physical address translation for a given local request is present in the translation lookaside buffer, a bus request is placed in an output request queue to service the local request. If the physical address is not present in the translation lookaside buffer, a bus request is placed on a bypass path to retrieve the physical address. Bus requests are issued to the bus from the bypass path with priority over bus requests in the output request queue. As a result, if the physical address for a local request is not present locally, prior bus requests in the output request queue are serviced while the physical address is retrieved. System performance is enhanced because bus requests can issue while the physical address for a subsequent local request is retrieved and processed.

At its most general level the invention operates in an environment of ordered operations wherein each operation is associated with corresponding information that has latency involved with its retrieval. The invention can be employed in any environment, hardware or software, where this condition of ordered operations applies. The invention can be embodied for instance in a series of dependent ordered processes. In this case, a process issues local requests that result in the issuance of external requests to external processes and external responses from external processes. The local requests are issued in order to a request handling process. Each local request requires corresponding associated information in order to be processed. When not already locally present, there is a latency associated with retrieving the corresponding associated information for a given local request. In accordance with the invention, the request handling process includes a local process for storing some associated information. The request handling process also includes an output queuing process for storing queued requests, and a bypass process. A servicing process operates on each local request. If the corresponding associated information is presented by the local process for a given request the servicing process passes the local request to the output queuing process. If the corresponding associated information is not presented by the local process for a given request, the servicing process passes the local request to the bypass process. A prioritizing process prioritizes any request pending in the bypass process over any request in the output queuing process and passes such request to an external process. The requests in the output request queuing process can then be issued during the latency time associated with the return of the corresponding associated information to the local process. Thus, useful work is done during the latency associated with the retrieval of the associated information, in that previously queued requests can be serviced during this time.

BRIEF DESCRIPTION OF THE DRAWINGS

FIG. 12 is a flow diagram, showing the operation of the processes of FIG. 11 in accordance with the invention.

DETAILED DESCRIPTION OF EXEMPLARY EMBODIMENTS

Figure 1:
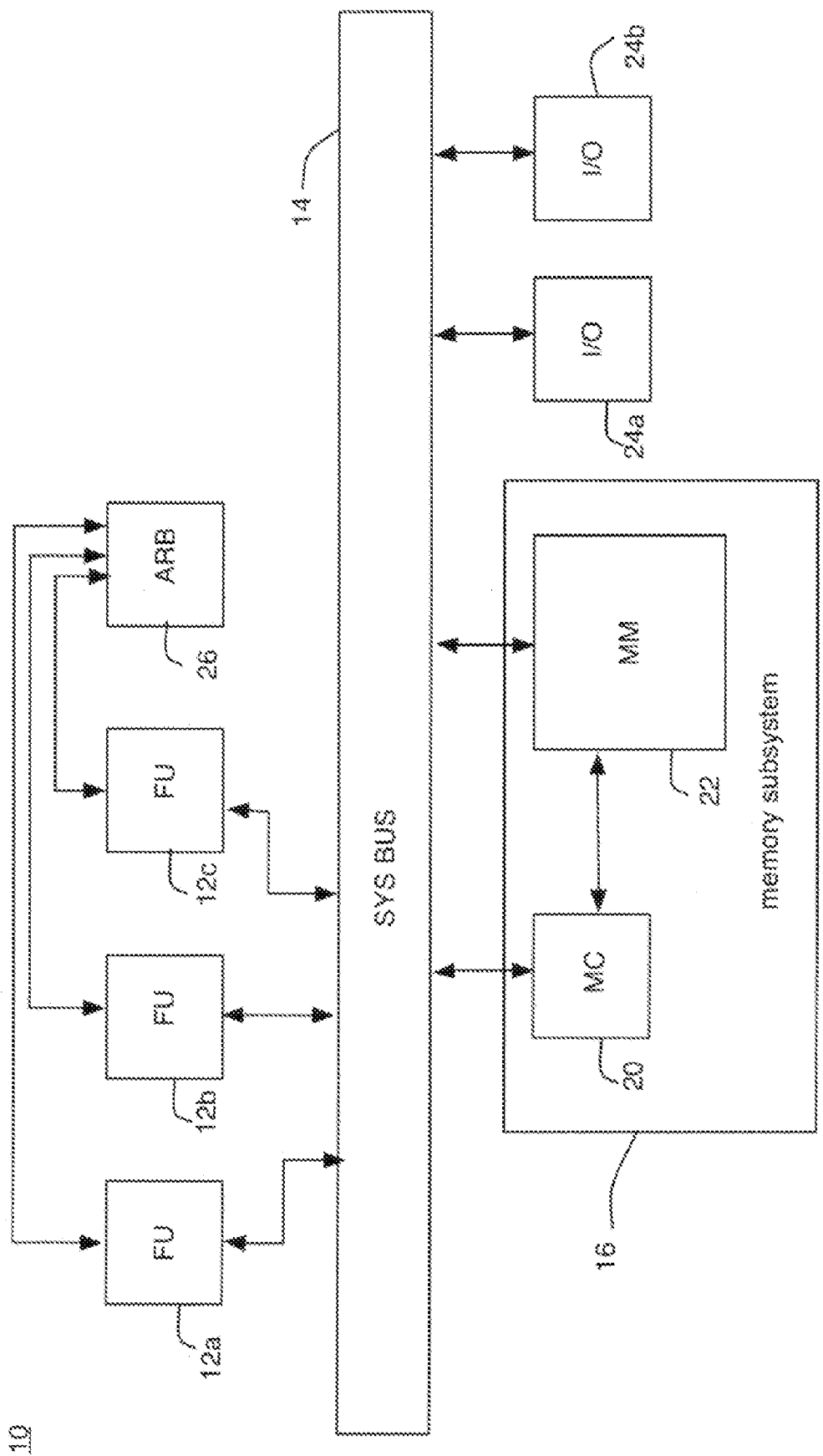
FIG. 1 is a schematic representation of a system wherein multiple functional, units, memories, and other devices are coupled to a system bus.

The invention may be employed in many different system architectures. A generalized example of such a system is shown in FIG. 1. In FIG. 1, a system 10 includes multiple functional units 12, herein shown individually as 12a, 12b, 12c coupled to a system bus 14. A memory subsystem 16 including a memory controller 20 and memory 22 is also coupled, to the system bus 14. Various I/O devices 24, herein shown 24a, 24b are also coupled to the bus 14. Communications occur between all the functional units, memory, and I/O devices via the system bus 14. (More complicated architectures will incorporate several levels of busses and interconnects without departing from the applicability of the invention). Each functional unit 12 may in turn include a plurality of devices, busses, and memories, and may include hardware, software, or a combination. An arbiter 26 controls access to the system bus 14 by the various functional units 12, memory subsystem 16, and I/O devices 24 coupled thereto. Examples of system 10 may include, for example, application specific integrated circuits (ASICs) including graphical processing units (GPUs), bridge devices (such as northbridge devices), multimedia processors, central processing units (CPUs) and the like. Further examples of system 10 may include motherboards, personal computers (mobile or desktop), personal digital assistants (PDAs), handheld devices (such as mobile phones) and other computer processing devices.

The functional units 12 service respective local requests in furtherance of performing their functions, some of which require access to the system bus 14 and memory subsystem 16 or other devices coupled thereto. For instance, the functional unit 12a may be a graphics processing unit that requires access to the system bus 14 to perform a memory read operation from memory 22 in order to satisfy a local rendering request. When the arbiter 26 has granted the functional unit 12a access to the system bus 14, the functional unit 12a services its local rendering request by issuing a system bus request that results in a system bus transaction. As herein used, a system bus transaction is associated with one or more system bus accesses. A system bus access may involve one or more system bus cycles or beats. All such system bus accesses are considered part of the transaction that services the system bus request. For example, the functional unit 12a may issue a system bus request to perform a memory read, from main memory 22. The read data will be returned during a system bus transaction consisting of one or more system bus accesses, each including a certain number of beats.

A given functional unit such as unit 12a services local requests for various functional entities within it. The servicing of one local request may complete internally to the functional unit 12a, requiring no system bus requests. Another type of local request may require issuance of a single system bus request—i.e. a single stage request. (The servicing of this single stage request may result in a bus transaction including multiple system bus accesses as described above.) The same functional unit 12a might also service a local request that causes multiple system bus requests, each resulting in a separate bus transaction—i.e. a multi-stage request. The invention applies to multi-stage requests where the stages are dependent—that is, a local request requiring multiple system bus requests cannot be completed until all its system bus requests have issued to the system bus and completed in order. In an ordered system, no subsequent local requests can be processed until a previous multi-stage request has completed; i.e. subsequent requests cannot issue in between the stages of a multi-stage request.

A functional unit such as 12a can service various types of local requests that might result in a multi-stage system bus request. Generally, a local request that requires associated information in order to be serviced can result in a multi-stage request. An example of a local request resulting in a multi-stage system bus request is a request, to service a local instruction. In some cases the information needed to perform the instruction is stored in a local buffer or cache on the functional entity, and is fetched locally. A single system bus request i.e. a single stage system bus request—would issue to retrieve the data upon which the instruction should be performed. But another instruction might require more information from memory in order that it can be performed. Thus a multi-stage system bus request results. The first stage is a system bus request for the information needed to perform the instruction. The second stage is the system bus request to retrieve the data upon which the instruction should be performed.

Another example of a local request resulting in a multi-stage system bus request, is a request involving metadata. Metadata is data used to describe other data—e.g. status information, priority information, and the like. A functional unit may store frequently used metadata in a cache or buffer, while remaining less frequently used metadata is stored in main memory. A local request might require that metadata be included in a system bus request. If the metadata is present in the cache, it is retrieved, and a single stage system bus request is issued. If the metadata is not in the cache, a multi-stage system bus request is issued. The first system bus request retrieves the metadata from memory. The second system bus request issues the local request with its metadata.

Another example of a local request resulting in a multi-stage system bus request occurs in a functional unit employing virtual addressing. Such a functional unit typically contains a memory management unit ("MMU"). In such a functional unit, a local request is issued with a virtual address. The MMU translates the virtual address to a physical address. The physical address and request are then issued as a system bus request. Many MMUs include a translation lookaside buffer ("TLB") for storing a limited number of virtual to physical address translations. If a physical address is present in the TLB, a single stage system bus request will occur. But if the physical address is not present in the TLB, a multi-stage system bus request will occur. The first system bus request retrieves the physical address from memory. The second system bus request issues the request with the physical address. Note that the second system bus request cannot issue until the first is completed, nor can subsequent requests issue.

The following is a general description of the operation of a functional unit in accordance with prior art arrangements, and then as it operates when the invention is employed. Comparison demonstrates a significant performance increase with employment of the invention. The invention will then be described as it is implemented in a functional unit containing an MMU, wherein multi-stage transactions result from a TLB miss.

Figure 2:
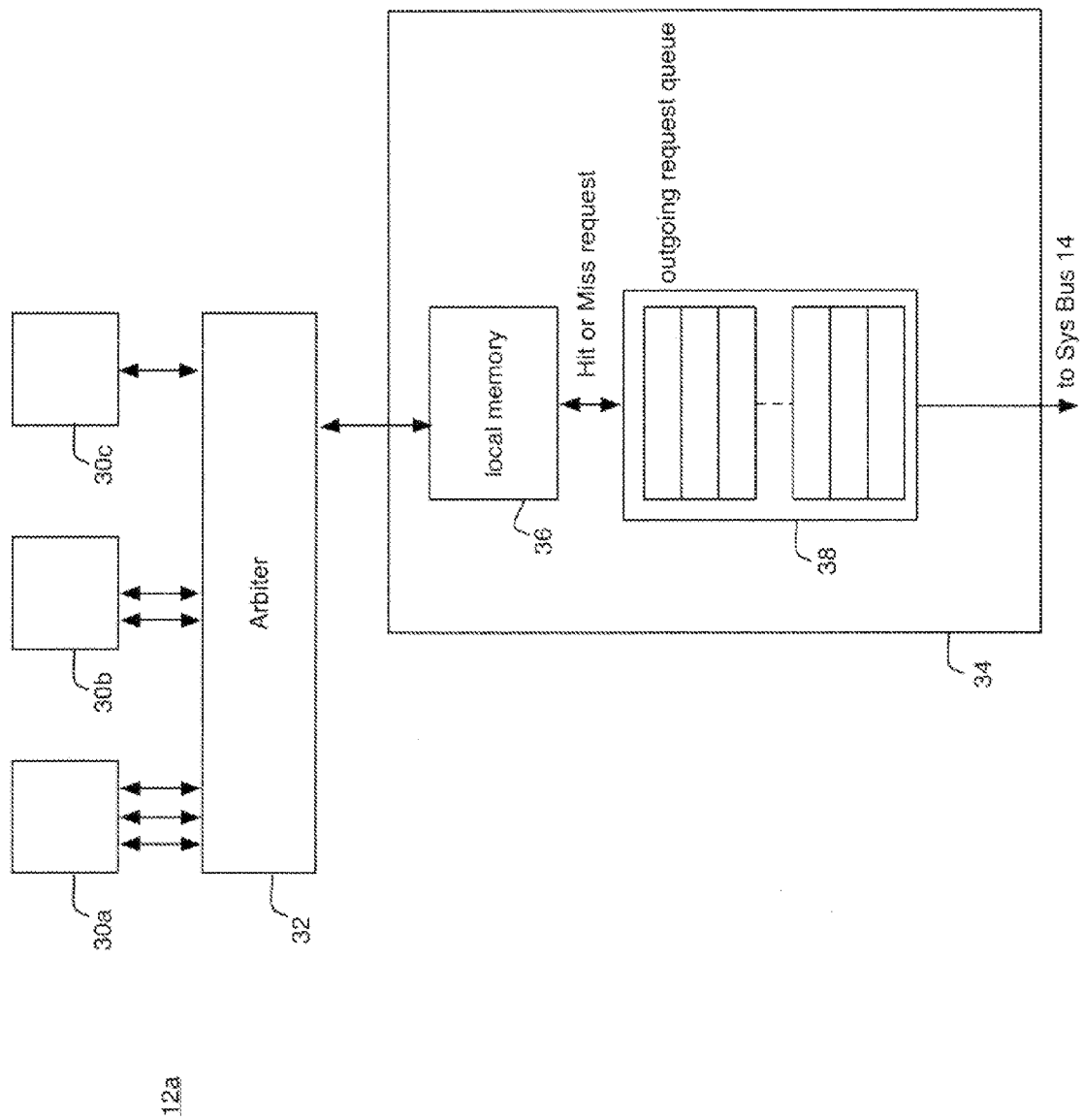
FIG. 2 is a schematic representation of one of the functional units of FIG. 1 in accordance with the prior art.

An example of one of the functional units 12a arranged in accordance with the prior art is shown in further detail in FIG. 2. Within this functional unit 12a, various functional entities 30, herein shown 30a, 30b, 30c, issue local requests, some of which require access to the system bus 14 to access the memory 22 and other resources coupled to the system bus 14. An arbiter 32 controls access by the functional entities 30 to a memory controller 34. Within the memory controller 34 is a local memory 36 coupled to an outgoing request queue 38. The outgoing request queue 38 queues system bus requests to be issued to the system bus 14 in order.

Some local requests generated by a given functional entity 30 within a functional unit require that the memory controller have certain corresponding associated information before a system bus request can be queued. For instance, as previously described, a local instruction may need further instruction data before a system bus request can issue. Another local request might require attachment of metadata before a system bus request can issue. A local request might have a virtual address and require a physical address translation before a system bus request can issue. Whatever the case, the local memory 36 stores a limited number of entries containing such associated information.

Figure 3:
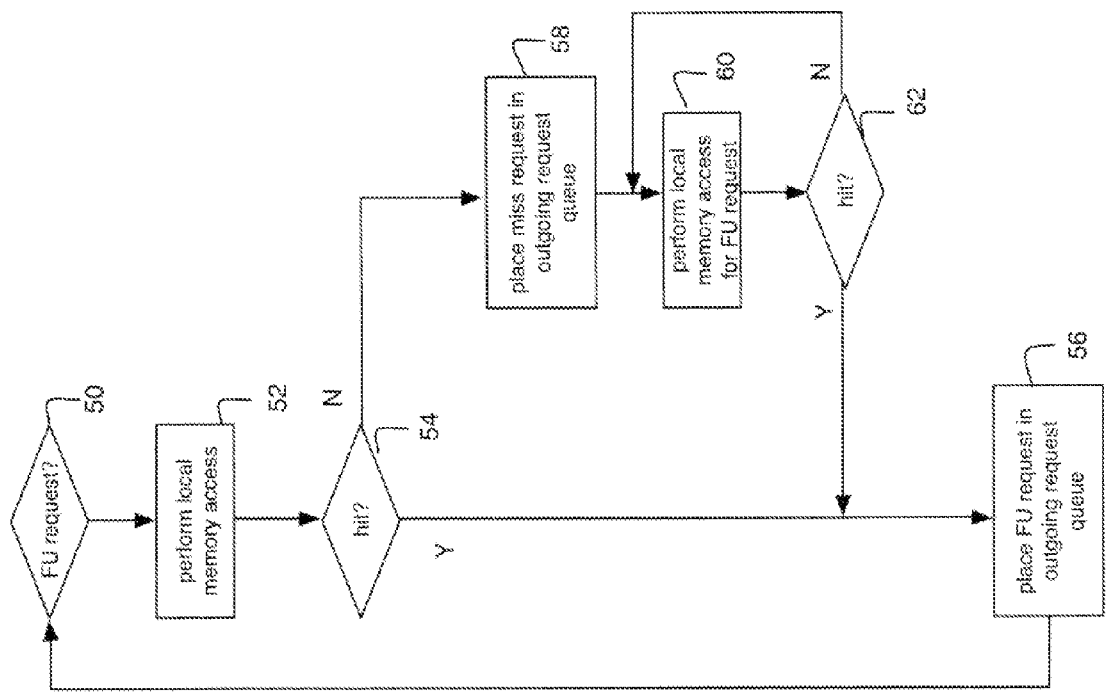
FIG. 3 is a flow diagram showing the operation of the prior art memory controller of FIG. 2.

The operation of the prior art memory controller is described with reference to FIG. 2 and the flow diagram of FIG. 3. When the memory controller 34 receives a local request from one of the functional entities 30 (step 50), it accesses the local memory 36 (step 52) to ascertain whether the corresponding associated information is present (step 54). If the associated information is present (a "hit"), then the associated information is used to modify the local request to produce a system bus request. (For example, the associated information may replace part of the local request, or be appended to the local request, amongst other things.) The system bus request is then placed in the outgoing request queue 38 (step 56). This is a single-stage request because only one system bus request results from the local bus request.

If the corresponding associated information is not found in the local memory (a "miss"), then a system bus request is generated by the memory controller 34 to retrieve the missing associated information from the main memory via the system bus 14. This is referred to as a "miss request" (step 58). In accordance with, prior art arrangements, this miss request is placed in the outgoing request queue behind previous bus requests. Once this miss request is completed, then the associated information is available in the local memory to modify the local request that caused the miss (steps 60, 62). A system bus request corresponding to the local request can now be placed in the outgoing request queue (step 56). Note that this local request has resulted in two system bus requests, and thus it is a multi-stage request. Note also the fact that once the first stage of the multi-stage request issues to the system bus, the outgoing request queue is stalled until this first stage request is completed and the second stage of the request is queued.

Figure 4:
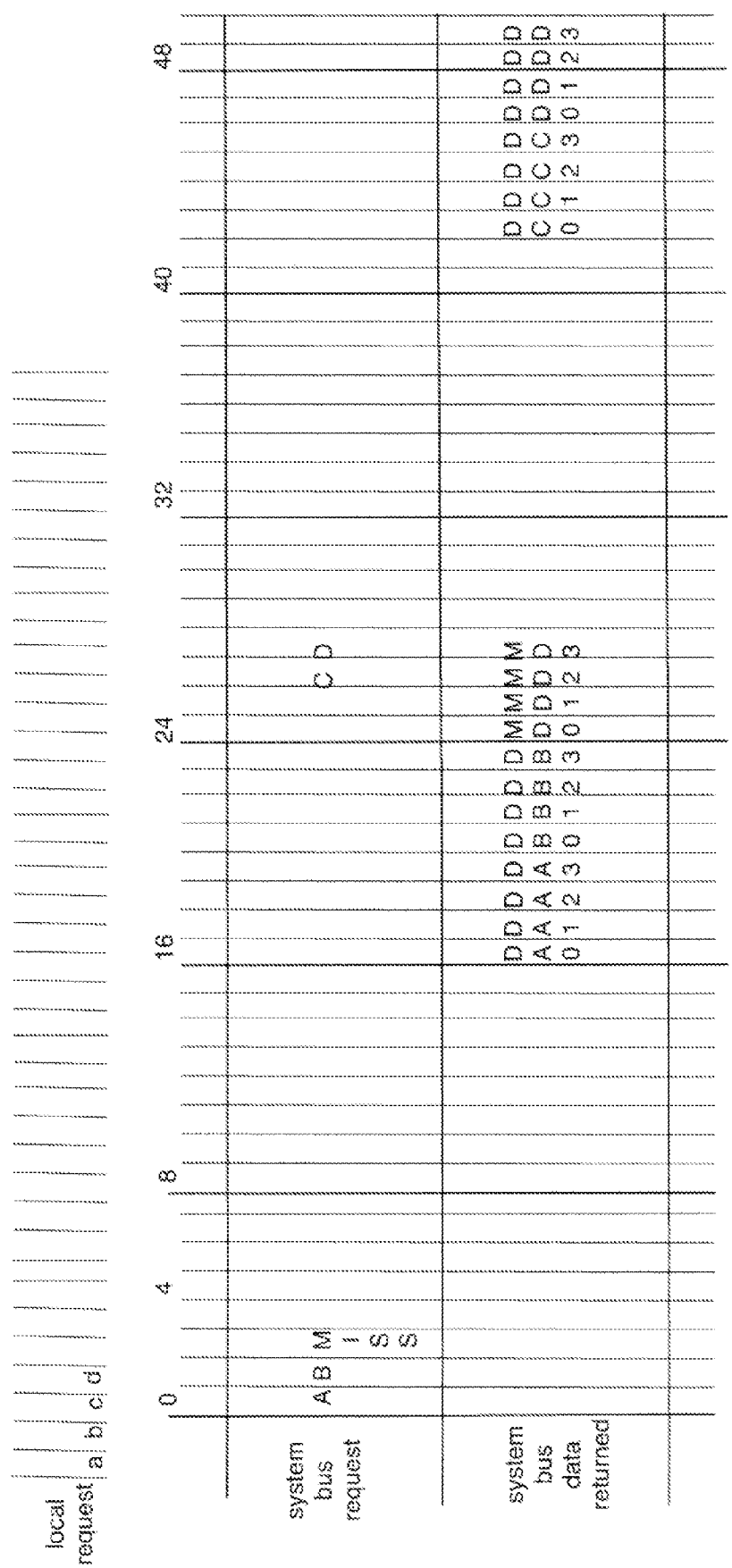
FIG. 4 is a timing diagram showing bus cycles associated with bus requests issued by the system of FIG. 2 in accordance with the prior art.

In FIG. 4 there is shown a timing diagram showing the system bus requests and transactions resulting from tour local requests issued to the memory controller 34 of FIG. 2. In the diagram, local requests are shown above system bus requests and transactions as occurring at some earlier time, this delay being implementation specific. The first two local requests, a and b, are local memory hits. The third local request, c, is a miss. The fourth, d, is a hit. The output request queue includes system bus requests A, then 8, then a Miss request (i.e. request to fetch information associated with local request c), then C, then D, which are issued to the system bus in this order. In this diagram, the following assumptions are made: each vertical slot in the system bus portion of the diagram represents a system bus data beat. Each system bus request returns four data beats. The best case system latency is 16 data beats. The system bus request A at beat 0 returns 4 beats of data (DA0-3) starting at beat 16. The data associated with system bus request B (DB0-3) follows. Then, at beat 24, the data associated with the miss request is returned (MD0-3), at which point the system bus requests C and D can be issued. 16 beats later, the data for system bus request C (DC0-3) is returned, followed by the data for system bus request D (DD0-3). As can be seen, a large delay occurs between the issuance of the B request and the C request because the Miss request had to be processed to retrieve information needed for the C request before the C request and subsequent requests could issue.

Figure 5:
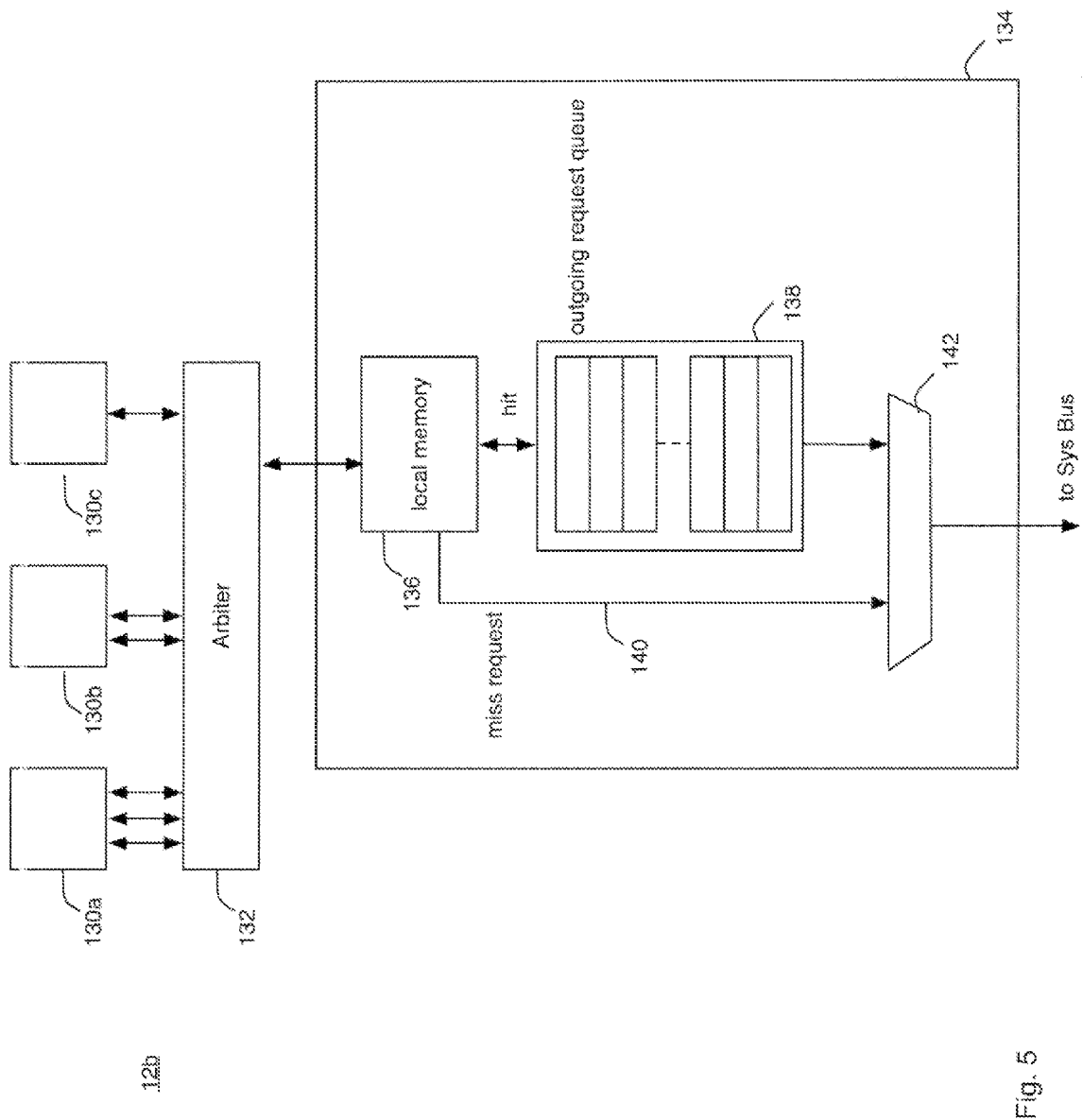
FIG. 5 is a schematic representation of one of the functional units of FIG. 1 employing the invention.

Now, shown in FIG. 5 is an example of one of the functional units 12 (FIG. 1) employing the invention. Like the functional unit 12a of FIG. 2, this functional unit 12b includes various functional entities 130, herein shown 130a, 130b, 130c. These functional entities 130 issue local requests, some of which require access to the system bus 14 to access the memory 22 and other resources coupled to the system bus 14. An arbiter 132 controls access by the functional entities 130 to a memory controller 134. Within the memory controller 134 is a local memory 136 coupled to an outgoing request queue 138. The outgoing request queue 138 queues system bus requests to be issued to the system bus 14 in order.

The functional unit 12b of FIG. 5 differs from that of FIG. 2 in that a bypass path 140 bypasses the output request queue 138. A multiplexer or selector 142 couples the bypass path 140 and the output request queue 138 to the system bus 14. Now, when a local request to the local memory 136 generates a miss, the miss request is sent, via the bypass path 140 directly to the multiplexer 142. The multiplexer 142 grants priority to the bypass path 140 to issue the miss request to the system bus 14 before the next entry in the output request queue 138 is issued. Now, if a local request causes a miss in the local memory 136, the information associated with the local request will be retrieved via a system bus request immediately, and ahead of other system bus requests that have already been queued in the output request buffer 138. Thus, useful work is done during the latency associated with the retrieval of the associated information, in that previously queued system bus requests can be serviced during this time.

Figure 6:
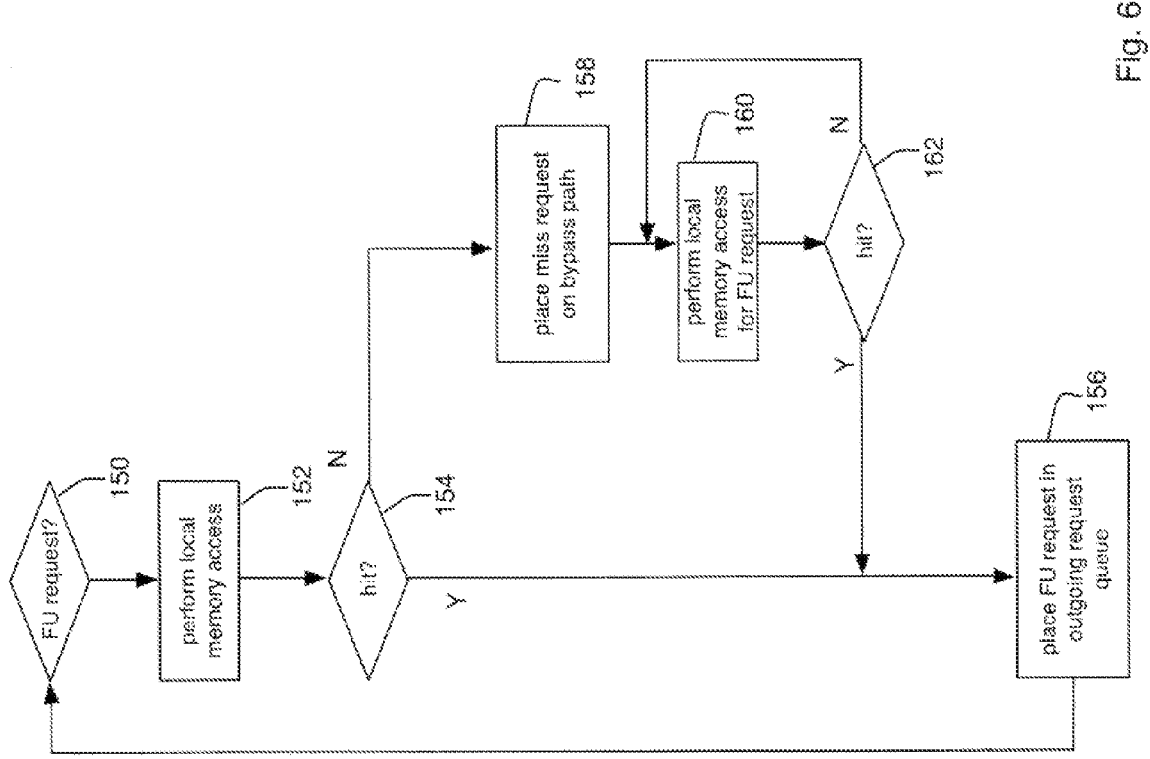
FIG. 6 is a flow diagram showing the operation of the memory controller of FIG. 5 in accordance with the invention.

The operation of the memory controller 134 of FIG. 5 is shown in the flow diagram of FIG. 6. When the memory controller 34 receives a local request from one of the functional entities 130 (step 150), it accesses the local memory 136 (step 152) to ascertain whether the corresponding associated information is present (step 154). If the associated information is present (a "hit"), then the associated information is used to modify the local request to produce a system bus request. The system bus request is then placed in the outgoing request, queue 138 (step 156). This is a single-stage request because only one system bus request results from the local bus request.

If the corresponding associated information is not found in the local memory (a "miss"), then a system bus request is generated by the memory controller 34 to retrieve the missing associated information from the main memory via the system bus 14. Again, this is referred to as a "miss request" (step 158). In accordance with the invention, this miss request is forwarded onto the bypass path 140, where the multiplexer 142 issues it immediately to the system bus. Once this miss request is completed, then the associated information is available in the local memory 136 to modify the local request that caused the miss (steps 160, 162). A system bus request corresponding to the local request can now be placed in the outgoing request queue (step 156). Note that this local request has resulted in two system bus requests, and thus it is a multi-stage request. The first stage of the multi-stage request is directed onto the bypass path 140 and issued directly to the system bus 14. The second stage of the multi-stage request is directed to the output request queue 138.

Figure 7:
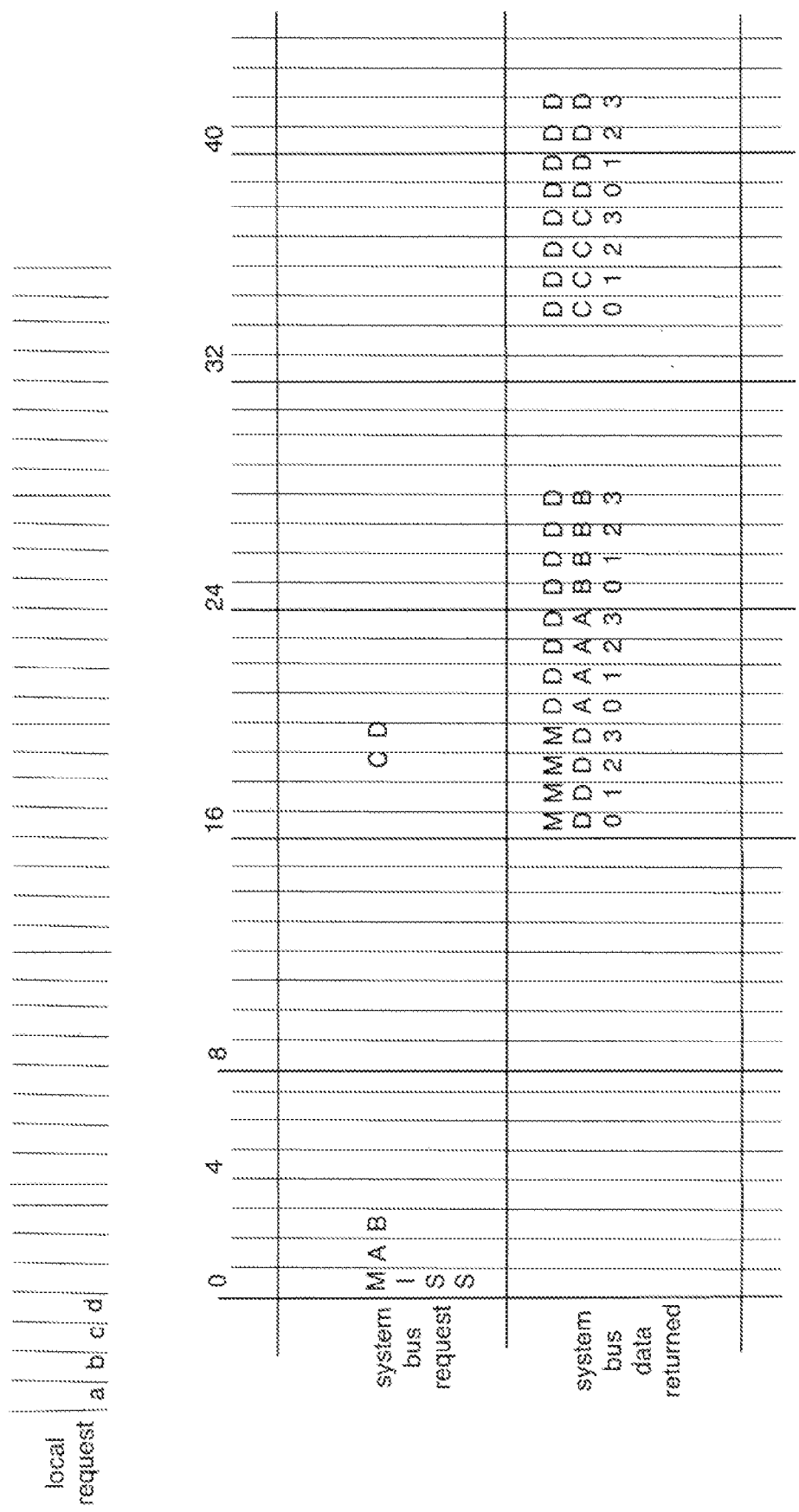
FIG. 7 is a timing diagram showing bus cycles associated with bus requests issued by the system of FIG. 5 in accordance with the invention.

FIG. 7 is a timing diagram showing the system bus requests and transactions resulting from four local requests issued to the memory controller 134 of FIG. 5, clearly demonstrating the advantage of the invention. The same four local requests a, b, c, d are issued to the local memory 136 as was seen in FIG. 4, and the same system bus timing assumptions operate. The first two local requests, a and b, are local memory hits. The third local request, c, is a miss. The fourth, d, is a hit. The output request queue includes system bus requests A and B. A miss request (i.e. request to fetch information associated with local request c), is sent via the bypass path 140 and multiplexer 142 directly to the system bus 14. Upon completion of the miss request, system bus requests C, then D issue. Since the bypass path 140 is serviced with priority over the output request queue 138, the order in which system bus requests occur as seen in FIG. 7 is Miss request. A, B, C, D. The miss request at beat 0 returns 4 beats of data (MD0-3) starting at beat 16. The system bus requests C and D can now issue. The data associated with system bus request A (DA0-3) follows starting at beat 20. Then the data for the system bus request B (DB0-3) is returned starting at beat 24. Then, at beat 34, the data associated with system bus request C (DC0-3) is returned. The DC0-3 data is returned only 10 beats later than the DB0-3 data, because the miss request was issued to the system bus before the B request, and processed during the A and B transactions.

In comparing the timing diagrams of FIGS. 4 and 7, it can be seen that the invention provides an overall performance increase. The local request c results in a multi-stage system bus request. In the system of FIG. 5 employing the invention, the second stage system bus request, associated with the local request C is queued much sooner than it is in the prior art system of FIG. 3. In the prior art system of FIGS. 2-4, all four system bus requests are completed in 50 beats, in the system employing the invention as demonstrated in FIGS. 5-7, all four system bus requests are completed in 43 beats. Actual performance increases will depend on many system parameters, including system, bus timing, as those skilled in the art are aware.

Figure 8:
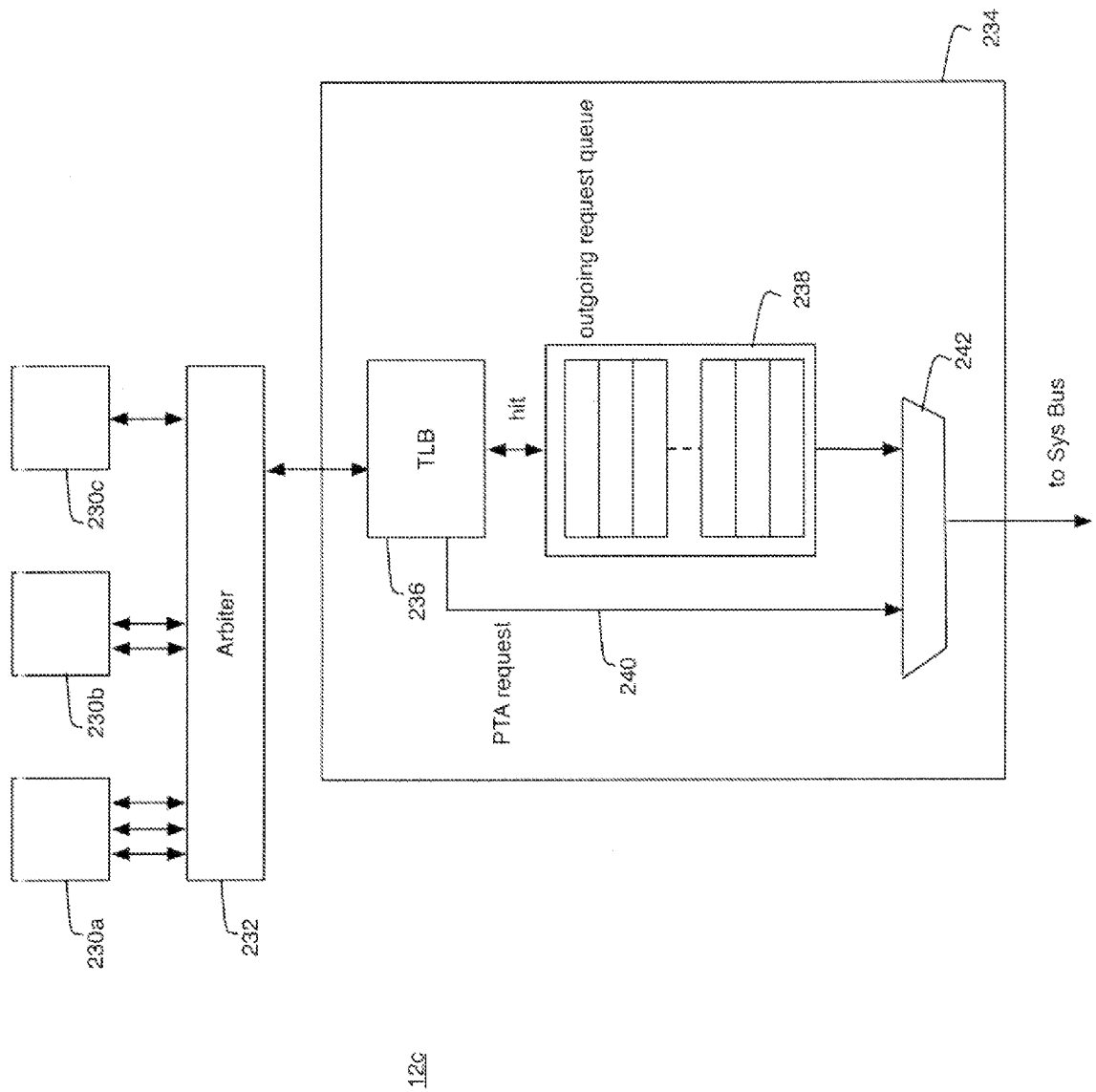
FIG. 8 is a schematic representation of one of the functional units of FIG. 1 employing virtual addressing and an MMU in accordance with the invention.

In FIG. 8 there is shown a particular implementation of the invention of FIG. 5. The functional unit 12c includes various functional entities 230, herein shown 230a, 230b, 230c. These functional entities 230 employ virtual addressing. The functional entities 230 issue local requests with virtual addresses, some of which require access to the system bus 14 to access the memory 22 and other resources coupled to the system bus 14. An arbiter 232 controls access by the functional entities 230 to a memory management unit ("MMU") 234. Within the MMU 234 is a translation lookaside buffer ("TLB") 236 coupled to an outgoing request queue 238. The outgoing request queue 238 queues system bus requests to be issued to the system bus in order. A bypass branch 240 bypasses the output request queue 238. A multiplexer or selector 242 couples the bypass branch 240 and the output request queue 238 to the system bus 14.

Figure 9:
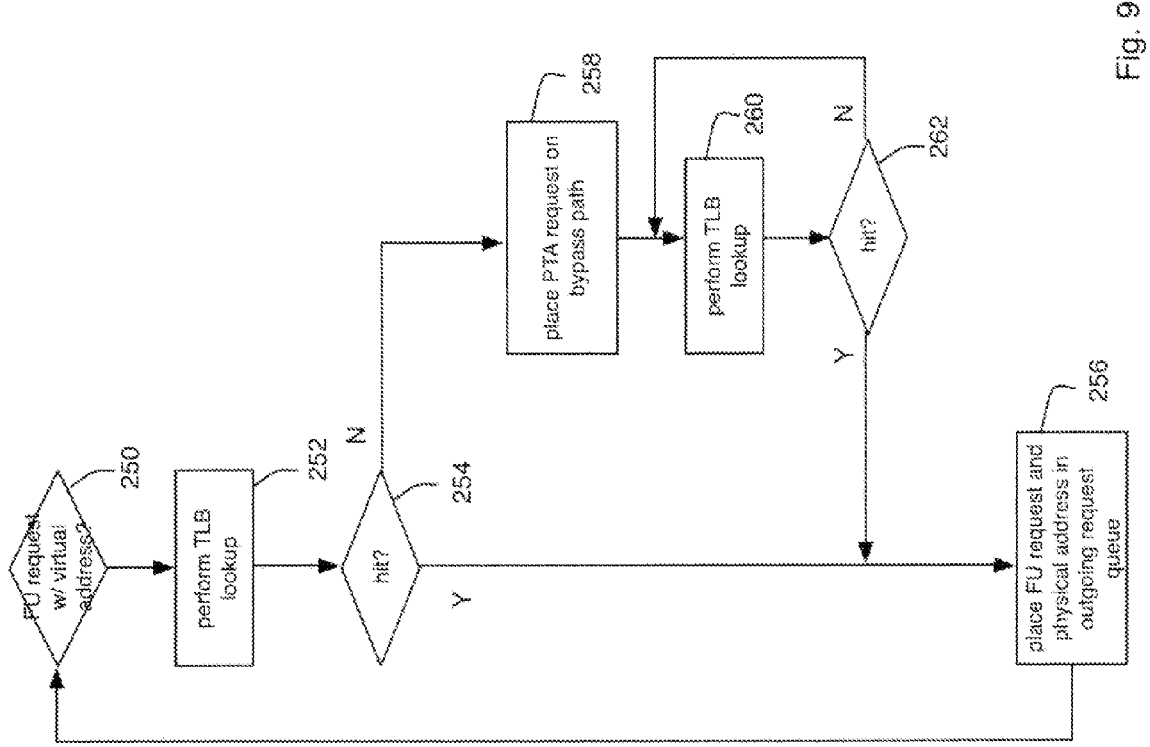
FIG. 9 is a flow diagram showing the operation of the MMU of FIG. 8 in accordance with the invention.

The TLB 236 can hold a limited number of virtual to physical address translations. The MMU 234 operates as shown in the flow diagram of FIG. 9. When a local request with a virtual address is received (step 250), a TLB lookup is performed to ascertain whether a corresponding physical address exists in the TLB (step 252). If so, a TLB Hit has occurred (step 254). A system bus request having the physical address retrieved from the TLB 236 is placed directly in the outgoing request queue (step 256). Thus this is a single stage system bus request. When no physical address translation exists in the TLB 236 for a virtual address presented to it, the transaction is referred to as a TLB Miss (step 254). The TLB miss causes the MMU 234 to generate a page table access system bus request to access page tables in main memory (FIG. 1, 22) to retrieve the physical address associated with the virtual address of the local request that caused the TLB Miss (step 258). The associated physical address is returned from main memory via the system bus 14 to the TLB 236. The virtual to physical address translation then occurs (steps 260, 262), and a system bus request with its physical address is placed in the outgoing request queue 238 (step 256). In this case, a multi-stage request occurs—the first stage is issued to the bypass path 240 to retrieve the physical address for the local request via the system bus 14. The second stage issues the actual system bus request with its physical address to the system bus 14 via the output request queue 238.

Figure 10:
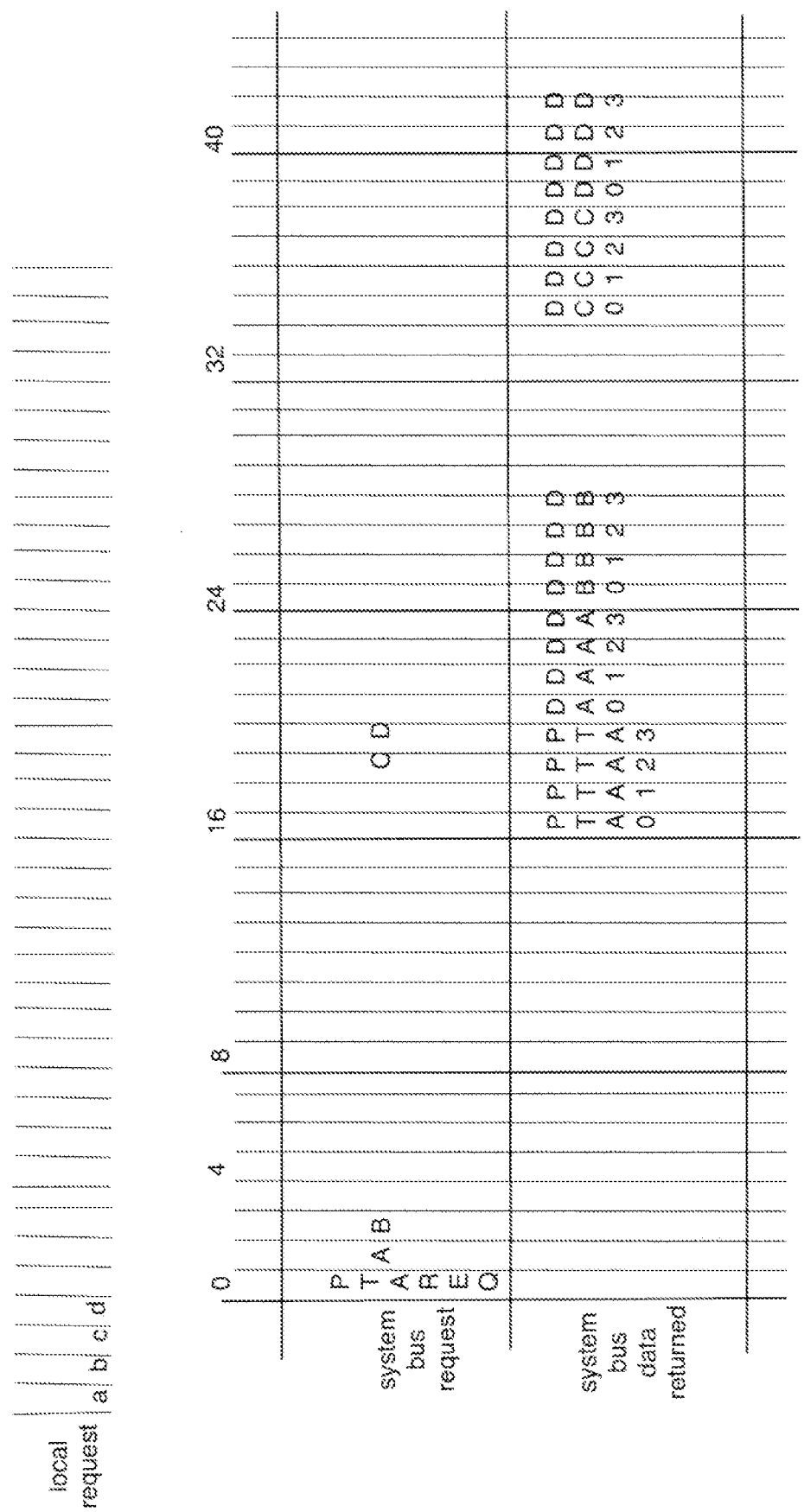
FIG. 10 is a timing diagram showing bus cycles associated with bus requests issued by the system of FIG. 8 in accordance with the invention.

In FIG. 10 there is shown a timing diagram wherein four local requests are issued to the MMU of FIG. 8. The same system bus timing assumptions operate as in FIGS. 4 and 7. The first two local requests, a and b, are TLB hits. The third local request, c, is a TLB miss. The fourth, d, is a hit. The output request queue includes system bus requests A and B with their corresponding physical addresses. In response to the TLB miss for local request c, a page table access request (PTA request) is sent via the bypass path 140 and multiplexer 142 directly to the system bus 14 to retrieve the physical address associated with the virtual address for request c. Upon completion, of the PTA request, system bus request C can issue with its physical address. Then D issues. Since the bypass path 240 is serviced with priority over the output request queue 238, the order in which system bus requests occur as seen in FIG. 7 is PTA request, A, B, C, D. The PTA request at beat 0 returns 4 beats of data (PTA0-3) starting at beat 16. The system, bus requests C and D can now issue. Meanwhile the data associated with system bus request A (DA0-3) is returned starting at beat 20. Then the data for the system bus request B (DB0-3) is returned starting at beat 24. Then, at beat 34, the data associated with system bus request C (DC0-3) is returned, followed by the data for system bus request D (DD0-3). The DC0-3 data is returned only 10 beats later than the DB0-3 data, because the PTA request was issued to the system bus before the A and B requests, and the physical, address was resolved during the A and B transactions. System performance is enhanced because useful work is performed on prior requests during the latency associated with the TLB miss.

Figure 11:
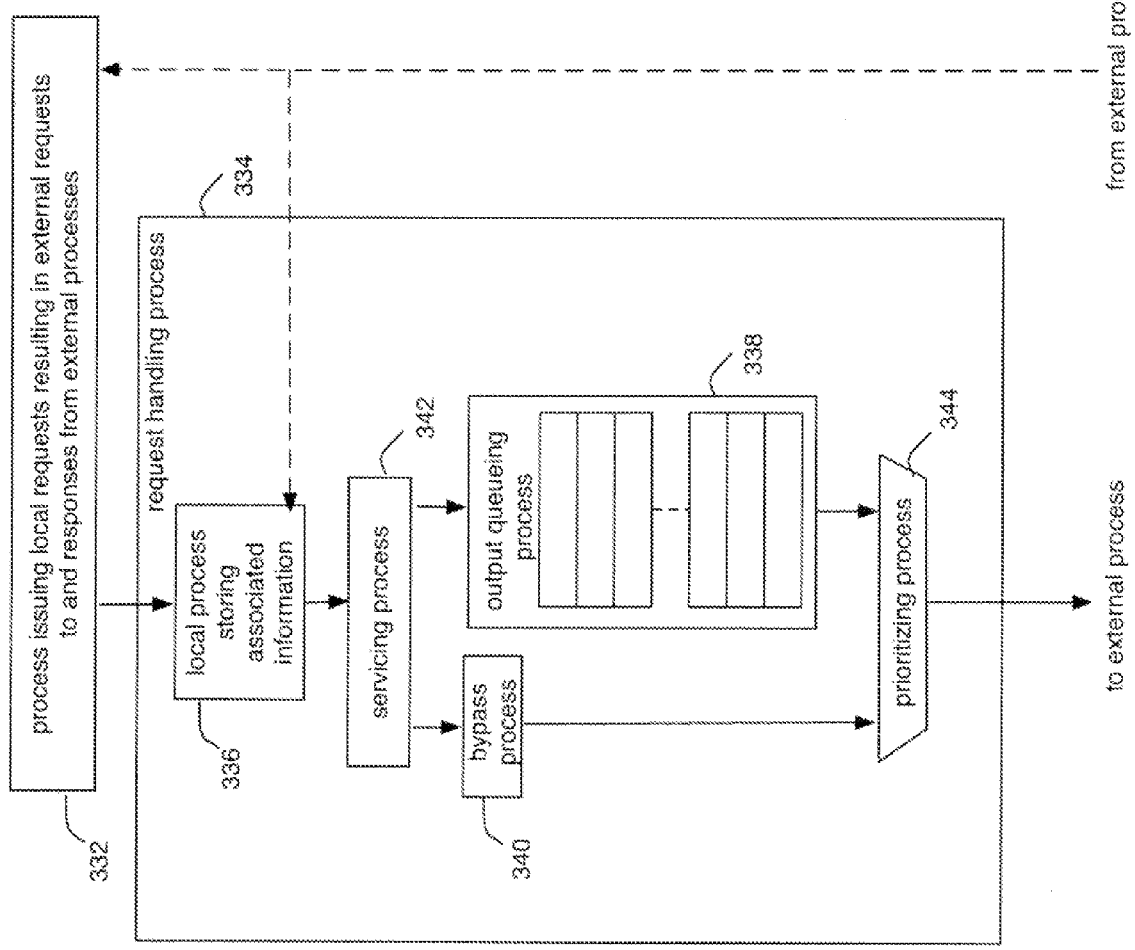
FIG. 11 is a schematic representation of the invention as employed as a series of dependent ordered processes.

At its most general level the invention operates in an environment of ordered operations wherein each operation is associated with corresponding information that has latency involved with its retrieval. Memory structures such as MMUs served as examples above. But the invention can be employed in any environment, hardware or software, where this condition of ordered operations applies. In FIG. 11 the invention is shown as embodied in a series of dependent ordered processes. In this case, a process 332 issues local requests that result in the issuance of external requests to external processes and external responses from external processes. The local requests are issued in order to a request handling process 334. Each local request requires corresponding associated information in order to be processed. When not already locally present, there is a latency associated with retrieving the corresponding associated information for a given local request.

In accordance with the invention, the request handling process 334 includes a local process 336 for storing some associated information. The request handling process also includes an output queuing process 338 for storing queued requests, and a bypass process 340. A servicing process 342 operates on each local request. If the corresponding associated information is presented by the local process 336 for a given request, the servicing process passes the local request to the output queuing process 338. If the corresponding associated information is not presented by the local process 336 for a given request, the servicing process 342 passes the local request to the bypass process 338. A prioritizing process 344 prioritizes any request pending in the bypass process 340 over any request in the output queuing process 338 and passes such request to an external process (i.e. external to the processes shown in FIG. 11). If for instance the corresponding associated information for a local request is not presented by the local process 336, the servicing process 342 will pass a request for the corresponding information to the bypass process 340. The prioritizing process 344 (e.g. multiplexer) will pass this request to the external process before any queued requests from the output request queuing process 338 are issued to the external process. The requests in the output request queuing process 338 can then be issued during the latency time associated with the return of the corresponding associated information to the local process 336. Thus, useful work is done during the latency associated with the retrieval of the associated information, in that previously queued requests can be serviced during this time.

The operation of the request handling process 334 of FIG. 11 is shown in the flow diagram of FIG. 12. When the request handling process 334 receives a local request from the process 332 (step 350), then if the corresponding associated information is presented (step 354), then a request to service the local request is passed to the output queuing process 338 (step 356). If the associated information is not presented, a request for the associated information is passed to the bypass process 340 (step 358). The prioritizing process 344 prioritizes the request for the associated information over any requests from the output queuing process to generate an external request for the information. Once the associated information is returned (step 360, 354) the local request and corresponding associated information can be passed to the output queuing process (step 356). As in the other embodiments, previously queued requests can be processed while associated information for a later request is retrieved, while the order of requests is maintained.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Furthermore, many functions described herein may be implemented in hardware or in software. Further, software descriptions of the invention can be used to produce hardware implementing the invention. For example, many hardware designs today are produced by describing the design first in software, for example in a hardware description language such as verilog, which can then be sold or licensed as a "core" to produce a hardware chip or part of a chip, and the claims are intended to cover all such implementations. Software maybe embodied on any known non-transitory computer readable medium having embodied therein a computer program for storing data. In the context of this document, a computer readable storage medium may be any tangible medium that can contain, or store a program for use by or in connection with an instruction execution system, apparatus, or device. A computer readable storage medium may be, for example, an electronic, magnetic, optical, electromagnetic, infrared, or semiconductor system, apparatus, or device, or any suitable combination of the foregoing. More specific examples of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for use in a system coupled to a bus, the system issuing local requests, a local request requiring corresponding associated information in order to be serviced, the apparatus comprising:

a local memory for storing some of said associated information, said associated information necessary to complete a given local request, such that for each given local request, said associated information is either present in the local memory or must be retrieved via a bus request;

an output request queue coupled between the local memory and the bus for storing bus requests;

a bypass path element coupled between the local memory and the bus, in parallel with the output request queue, for forwarding bus requests between the local memory and the bus, a first end of the output request queue and a first end of the bypass path element each connected to the local memory, a second end of the output request queue opposite the first end of the output request queue and a second end of the bypass path element opposite the first end of the bypass path element each in communication with the bus;

logic for servicing local requests, the logic operable for each local request by controlling the output request queue and bypass path element operations as follows:

if the associated information is present in the local memory, place in the output request queue by outputting to the first end of the output request queue a bus request to service the local request;

if the associated information is not present in the local memory, place on the bypass path element by outputting to the first end of the bypass path element instead of the output request queue a first stage request of a multi-stage bus request to retrieve the associated information, and place a second stage request of the multi-stage bus request in the output request queue in response to the first stage request;

the logic further operable to issue bus requests on the bypass path element with priority over bus requests in the output request queue so that bus requests placed in the output request queue prior to the servicing of the local request can continue to issue from the second end of the output request queue opposite the first end of the output request queue to the bus while the associated information is retrieved.

2. The apparatus of claim 1 wherein the logic for servicing local requests is further operable for each local request as follows:

once the associated information has been retrieved, place the associated information in the local memory, and place in the output request queue a bus request to service the local request.

3. The apparatus of claim 1 wherein a local request includes a virtual memory address, and wherein the associated information is a physical address, and wherein the apparatus is a memory management unit, and wherein the local memory is a translation lookaside buffer.

4. The apparatus of claim 1, further comprising a selection device that is coupled between each of the second end of the output request queue and the second end of the bypass path element and the bus, the selection device granting a priority to one of the output request queue and the bypass path element.

5. A memory management unit (MMU) for use in a system coupled to a bus, the system issuing local requests with virtual addresses, the apparatus comprising:

a translation lookaside buffer (TLB) for storing physical addresses corresponding to virtual addresses;

an output request queue coupled between the TLB and the bus for storing bus requests;

a bypass path element coupled to the bus between the TLB and the bus in parallel with the output request queue, a first end of the output request queue and a first end of the bypass path element each connected to the TLB, a second end of the output request queue opposite the first end of the output request queue and a second end of the bypass path element opposite the first end of the bypass path element each in communication with the bus;

logic for servicing local requests, the logic operable for each local request by controlling the output request queue and bypass path element operations to:

place in the output request queue by outputting to the first end of the output request queue a bus request to service the local request at the physical address if the physical address is present in the TLB;

place on the bypass path element by outputting to the first end of the bypass path element instead of the output request queue a first stage request of a multi-stage bus request to retrieve the physical address corresponding to the virtual address in the local request and to further issue a second stage request of the multi-stage bus request to the bus via the output request queue in response to the first stage request if the physical address is not present in the TLB;

the logic further operable to issue bus requests on the bypass path element with priority over bus requests in the output request queue so that bus requests placed in the output request queue prior to the servicing of the local request can continue to issue from the second end of the output request queue opposite the first end of the output request queue to the bus while the associated information is retrieved.

6. The apparatus of claim 5 wherein the logic for servicing local requests is further operable for each local request to:

once the physical address has been retrieved, place the physical address in the TLB, and place in the output request queue a bus request to service the local request.

7. The apparatus of claim 5, further comprising a selection device that is coupled between each of the second end of the output request queue and the second end of the bypass path element and the bus, the selection device granting a priority to one of the output request queue and the bypass path element.

8. A method for use in a system coupled to a bus, the system issuing local requests, the method comprising the steps of:

receiving local requests, a local request requiring corresponding associated information in order to be serviced, said associated information being either present in a local memory or be retrievable via a bus request;

for each local request, controlling an output request queue and a bypass path element as follows:

placing in an output request queue coupled between the local memory and the bus a bus request to service the local request if the associated information is present in the local memory;

placing on a bypass path element coupled between the local memory and the bus in parallel with the output request queue, instead of in the output request queue, a bus request to retrieve the associated information if the associated information is not present in the local memory, a first end of the output request queue and a first end of the bypass path element each connected to the local memory, a second end of the output request queue opposite the first end of the output request queue and a second end of the bypass path element opposite the first end of the bypass path element each in communication with the bus;

issuing bus requests on the bypass path element with priority over bus requests in the output request queue so that bus requests placed in the output request queue prior to the servicing of the local request can continue to issue to the bus while the associated information is retrieved, wherein the bus requests on the bypass path element include a first stage request of a multi-stage bus request to retrieve the associated information, and wherein a second stage request of the multi-stage bus request is placed in the output request queue in response to the first stage request.

9. The method of claim 8 further comprising the step of, for each local request:

once the associated information has been retrieved, placing the associated information in the local memory, and placing in the output request queue a bus request to service the local request.

10. The method of claim 8 wherein a local request includes a virtual memory address, and wherein the associated information is a physical address, and wherein the local memory is a translation lookaside buffer.

11. The apparatus of claim 8, further comprising: positioning a selection device between each of the second end of the output request queue and the second end of the bypass path element and the bus, the selection device granting a priority to one of the output request queue and the bypass path element.

12. A method for use in a memory management unit (MMU) in a system coupled to a bus, the system issuing local requests with virtual addresses, the method comprising the steps of:
  providing an output request queue and a bypass path element, the output request queue and the bypass path element coupled in parallel between the TLB and the bus, a first end of the output request queue and a first end of the bypass path element each connected to the local memory, a second end of the output request queue opposite the first end of the output request queue and a second end of the bypass path element opposite the first end of the bypass path element each in communication with the bus;
  receiving local requests;
  for each local request,
    placing in the output request queue by outputting to the first end of the output request queue a bus request to service the local request if the physical address is present in the TLB;
    placing on the bypass path element by outputting to the first end of the bypass path element, instead of in the output request queue, a first stage request of a multi-stage bus request to retrieve the physical address and issuing a second stage request of the multi-stage bus request to the bus via the output request queue in response to the first stage request if the physical address is not present in the TLB;
    issuing bus requests on the bypass path with priority over bus requests in the output request queue so that bus requests placed in the output request queue prior to the servicing of the local request can continue to issue from the second end of the output request queue opposite the first end of the output request queue to the bus while the physical address is retrieved.

13. The method of claim 12 further comprising the step of, for each local request:
  once the physical address has been retrieved, placing the physical address in the TLB, and placing in the output request queue a bus request to service the local request.

14. In a system, a request handling process for processing local requests to produce external requests to be issued to an external process,
  wherein local requests are processed in order, and wherein each local request requires corresponding associated information in order to be processed,
  wherein if the corresponding associated information for a local request is not locally present the corresponding associated information must be retrieved through an external request to an external process having latency associated therewith,
  the request handling process comprising:
    a local process for storing some associated information;
    an output queuing process coupled to the local process for storing queued requests for issuing to a bus to which to the output of the process is coupled;
    a bypass process coupled between the local process and the bus for operating in parallel with the output queuing process, the bypass process also issuing requests from the local process to the bus, a first end of the output queuing process and a first end of the bypass process each connected to the local process, a second end of the output queuing process opposite the first end of the output queuing process and a second end of the bypass process opposite the first end of the bypass process each in communication with the bus;
    a servicing process for servicing local requests, the servicing process operable for each local request to:
      pass to the output queuing process a queued request to service the local request if the corresponding associated information is presented by the local process;
      pass to the bypass process a first stage request of a multi-stage request to retrieve the corresponding associated information and pass to the output queuing process a second stage request in response to the first stage request if the corresponding associated information is not stored in the local process, instead of passing a request to the output queuing process; and
    a prioritizing process for issuing to an external process requests from the bypass process with priority over requests from the output request queue so that requests residing in the output queuing process prior to the servicing of the local request can continue to issue from the second end of the output queuing process opposite the first end of the output queuing process to the bus while the associated information is retrieved.

15. The request handling process of claim 14 wherein the servicing process is further operable for each local request to:
  once the corresponding associated information has been retrieved, pass the associated information to the local process, and pass to the output queuing process a queued request to service the local request.

16. A program product comprising a computer readable medium having embodied therein a computer program for storing data, the computer program product comprising:
  logic for producing a local memory for storing some of said associated information, said associated information necessary to complete a given local request, such that for each given local request, said associated information is either present in the local memory or must be retrieved via a bus request;
  logic for producing an output request queue coupled between the local memory and the bus for storing bus requests;
  logic for producing a bypass path element between the local memory and the bus in parallel with the output request queue for receiving bus requests, a first end of the output request queue and a first end of the bypass path element each connected to the local memory, a second end of the output request queue opposite the first end of the output request queue and a second end of the bypass path element opposite the first end of the bypass path element each in communication with the bus;
  logic for producing the capability to process local requests, a local request requiring corresponding associated information in order to be serviced, each local request processed to:

place in the output request queue by outputting to the first end of the output request queue a bus request to service the local request if the associated information is present in the local memory;

place on the bypass path element by outputting to the first end of the bypass path element instead of the output request queue a first stage request of a multi-stage bus request to retrieve the associated information a second stage request in response to the first stage request if the associated information is not present in the local memory; and logic for producing the functionality to issue to other logic bus requests on the bypass path element with priority over bus requests in the output request queue so that bus requests placed in the output request queue prior to the servicing of the local request can continue to issue from the second end of the output request queue opposite the first end of the output request queue to the bus while the associated information is retrieved.

17. The program product of claim 16 further comprising the step of, for each local request:

once the associated information has been retrieved, place the associated information in the local memory, and place in the output request queue a bus request to service the local request.

18. The program product of claim 16 wherein a local request includes a virtual memory address, and wherein the associated information is a physical address, and wherein the local memory is a translation lookaside buffer.

19. A program product comprising a computer readable medium having embodied therein a computer program for storing data, the computer program comprising logic for producing a memory management unit (MMU) for use in a system coupled to a bus, the system issuing local requests with virtual addresses, the logic for producing the MMU further comprising:

logic for producing a translation lookaside buffer (TLB) for storing physical addresses corresponding to virtual addresses;

logic for producing an output request queue coupled between the TLB and the bus for storing requests;

logic for producing a bypass path element coupled between the TLB and the bus in parallel with the output request queue for receiving bus requests, a first end of the output request queue and a first end of the bypass path element each connected to the TLB, a second end of the output request queue opposite the first end of the output request queue and a second end of the bypass path element opposite the first end of the bypass path element each in communication with the bus;

logic for producing the capability to process local requests, each local request processed to:

place in the output request queue by outputting to the first end of the output request queue a bus request to service the local request at the physical address if the physical address is present in the TLB;

place on the bypass path element by outputting to the first end of the bypass path element a first stage request of a multi-stage bus request to retrieve the physical address corresponding to the virtual address in the local request and place on the output queuing process a second stage request in response to the first stage request if the physical address is not present in the TLB;

logic for producing the functionality to issue to other logic bus requests on the bypass path element with priority over bus requests in the output request queue so that bus requests placed in the output request queue prior to the servicing of the local request can continue to issue from the second end of the output request queue opposite the first end of the output request queue to the bus while the physical address is retrieved.

20. The program product of claim 19 further comprising the step of, for each local request:

once the physical address has been retrieved, place the physical address in the TLB, and placing in the output request queue a bus request to service the local request.

* * * * *